United States Patent
Hara et al.

[11] Patent Number: 5,946,167
[45] Date of Patent: Aug. 31, 1999

[54] MAGNETORESISTIVE SENSOR HAVING LEAD AND/OR BIAS LAYER STRUCTURE CONTRIBUTING TO A NARROW GAP

[75] Inventors: Michiko Hara; Hiroaki Yoda, both of Kanagawa-ken; Yuichi Ohsawa, Tokyo, all of Japan

[73] Assignee: Kabushiki Kaisha Toshiba, Kawasaki, Japan

[21] Appl. No.: 08/816,432

[22] Filed: Mar. 14, 1997

[30]  Foreign Application Priority Data

Mar. 15, 1996 [JP] Japan .................................. 8-059683

[51] Int. Cl.$^6$ ...................................................... G11B 5/39
[52] U.S. Cl. ............................................................ 360/113
[58] Field of Search ............................................... 360/113

[56]  References Cited

U.S. PATENT DOCUMENTS

| | | | |
|---|---|---|---|
| 4,782,414 | 11/1988 | Krounbi ................................... | 360/113 |
| 5,463,517 | 10/1995 | Toda et al. . | |
| 5,493,465 | 2/1996 | Kamiguchi et al. . | |
| 5,707,538 | 1/1998 | Shen ........................................ | 360/113 |

FOREIGN PATENT DOCUMENTS 5-314432  5/1992  Japan .

OTHER PUBLICATIONS

U.S. Patent Application Serial No. 08/577,075, filed Dec. 22, 1995 (pending).

*Primary Examiner*—A. J. Heinz
*Attorney, Agent, or Firm*—Finnegan, Henderson, Farabow, Garrett & Dunner, L.L.P.

[57]  ABSTRACT

The present invention provides a magnetoresistive sensor comprising a magnetoresistive film (MR film) having a magnetic field response portion; a pair of leads on the MR film to supply sensing current to the MR film; and upper and lower (first and second) magnetic shield layers arranged so as to sandwich the MR film through a magnetic gap film, respectively. The pair of lead layers is deposited on the side of the magnetic field response portion, i.e., a portion of the MR film between the pair of the leads is the magnetic field response portion. The lead layer respectively provides multi-stage tapered portions, comprising a first tapered portion having a steep angle with respect to the MR film surface, and a second tapered portion having a shallow angle with respect to the MR film surface and provided continuously with the first tapered portion.

19 Claims, 13 Drawing Sheets

MAGNETORESISTIVE SENSOR HAVING LEAD AND/OR BIAS LAYER STRUCTURE CONTRIBUTING TO A NARROW GAP

BACKGROUND OF THE INVENTION

1. Field of the Invention

This invention relates to a magnetoresistive sensor and, in particular, magnetoresistive transducer for reading information signals from a magnetic medium.

2. Description of the Related Art

In recent years, magnetoresistive sensors (MR head) using a magnetic thin film or magnetic multi-layer thin film, have attracted attention in the effort to achieve high densities of magnetic recording in equipment, such as a hard disk drive (HDD).

A ferromagnetic film provides an MR effect called an AMR (anisotropic MR). In AMR, electric resistivity may change according to the angle between the direction of the sensing current in the ferromagnetic film and the direction of the magnetic field. A multi film comprising a sandwich structure of ferromagnetic layer/nonmagnetic layer/ferromagnetic layer, may also provide an MR effect called as GMR (giant MR), for example, a spin valve GMR. In a GMR, electric resistivity may change according to the angle between the magnetizations of the two ferromagnetic layers facing each other through the nonmagnetic layer. Both the AMR and GMR are called MR.

Such a recording/reading head comprises a shield-type MR head as a reading head, and an inductive coil as a recording head. The shield-type MR head comprises magnetic shield layers arranged above and below a magnetoresistive effect film (MR film).

When a shield-type MR head and inductive recording head are used in combination, usually, because an MR head requires a good surface flatness of a substrate and for processing reasons, the shield-type MR head is formed on a substrate and, typically, the inductive recording head is formed in laminated fashion on top of it.

Furthermore, the track width (TR) of a reading head (a shield-type MR head), is typically made narrower than the track width (TW) of the inductive recording head, because of signal to noise (S/N) considerations.

FIG. 15 is a cross-sectional view showing the construction of a conventional magnetic recording/reading head consisting of a combination of a shield-type MR head and an inductive recording head.

An MR film 4 is formed on a lower magnetic shield layer 2 on a substrate 1 with a lower reading magnetic gap layer 3 provided between the MR film 4 and the lower magnetic shield layer 2. The MR film 4 is formed, for example, in a stripe form. A pair of leads 5 is connected to both ends of the stripe. An upper magnetic shield layer 7 is formed on the MR film 4 with an upper reading magnetic gap film 6 provided between this upper magnetic shield layer 7 and MR film 4, thereby constituting a shield-type MR head (A).

The upper magnetic shield layer 7 also serves as a lower recording magnetic pole of an inductive recording head. A recording magnetic gap film 8 is formed on the upper magnetic shield layer 7. A recording coil is formed at the rear, though not shown in the drawings. An upper recording magnetic pole 9 is formed on the recording magnetic gap film 8, thereby constituting an inductive recording head (B).

Typically, since a magnetic field response portion of the MR film 4 is defined by the pair of leads 5, the space between the pair of leads 5 represents the width of the track of the reading head (TR). In this case, the leads 5 that supply sensing current to the MR film 4 may be formed by a lift-off method or an ion milling method.

The width of a portion of the upper recording magnetic pole 9 which faces the lower recording magnetic pole 7 through the recording magnetic gap film 8, is the track width of the recording track (TW).

Higher densities of a magnetic recording/reading head can be achieved by reducing the track width and a gap width. For example, in order to achieve recording densities as high as 3G bpsi, a track width of about 1 $\mu$m and gap width of about 0.1 $\mu$m are required in a shield type MR head 8 as described above. Also, in order to achieve such a narrow track, the leads 5 must be patterned precisely with a narrow separation. In addition, in order to achieve a narrow gap, electrical insulation between the leads 5 and the upper magnetic shielding layer 7 at the upper reading magnetic gap film 6 must be ensured. Therefore, a shallow forward taper is usually applied at the edges of the leads 5 so that the upper reading magnetic gap film 6 may be easily formed while providing good step coverage.

However, the shallow forward tapered shape of leads 5 involves not only the problem that it is difficult to precisely define the width of the reading track (TR) when a track width is reduced, but also problems arising from the method of forming, such as a lift-off method or an ion milling method. In particular, it is difficult to pattern the leads 5 by a lift-off method so as to realize both a narrow track width and narrow gap width.

The problem is due to a low resolution of the resist employed in a lift-off method. A reverse-tapered resist is often employed in a lift-off method in order to suppress the tendency of the film deposited on the resist to wrap round the side wall of the resist, because it will be easy to lift-off the deposited film from the resist. However, at present, the resolution of reverse-tapered resists is poor. Therefore, it is difficult to form a pattern of under a few microns. Further, such reverse-tapered resist lift-off may cause particle contamination when the resist is dissolved. In the case of a narrow-gap head, this can cause insulation breakdown.

On the other hand, in an ion milling method, when the leads 5 are formed having a shallow forward taper, a resist is employed that has the same taper at its edges as the tapered shape of the leads. The leads are formed by directing an ion beam at an inclined angle. The taper of the resist is transferred to the leads in the process of lead patterning. In this process, it is necessary to bake the resist at a comparatively high temperature in order to taper the edge parts of the resist after forming the resist along the shape of the leads. This baking of the resist at high temperature may cause interface diffusion in, for example, a spin valve GMR film. Such interface diffusion may decrease the degree of resistance variation. Further, since it is necessary to employ an alkaline developer to remove the resist, it may cause corrosion of the MR film.

If the shape of the lead edges is not shallowly tapered, this may result in imperfect insulation between the leads and the shield layer. In addition, the center of a flow of a sensing current will be different according to variations in thickness between the center and the edges of a magnetic field response portion of MR film. Therefore, it results in the direction of magnetization at the center of the magnetic field response portion being different from the direction of magnetization at the edges of the magnetic field response portion. Accordingly, even if the magnetization alignment is optimum at the center of the magnetic field response portion of the MR film, optimum magnetization alignment is lost at the edges of the magnetic field response portion of MR film, i.e., in the vicinity of the leads.

As described above, it is difficult to reduce the track width and the gap width for achieving further improvement in recording density. Also, it is extremely difficult to satisfy both the desired taper shape and desired space between leads with a conventional lift-off method or an ion milling method.

For the above reasons, it was considered to be a difficult challenge to precisely define in a shape corresponding to a reduced-size gap. It was also considered to be a difficult challenge to prevent the center of a flow of a sensing current from being different between the center region and the edge region of the magnetic field response portion.

SUMMARY OF THE INVENTION

Accordingly, an object of the present invention is to provide a magnetoresistive sensor wherein a narrow-gap and a narrow-track structure can be formed accurately and easily and thereby meet for increased recording density.

The present invention provides a magnetoresistive sensor comprising a magnetoresistive film (MR film) having a magnetic field response portion; a pair of leads on the MR film to supply sensing current to the MR film; and upper and lower (first and second) magnetic shield layers arranged so as to sandwich the MR film through a magnetic gap film, respectively. The pair of lead layers is deposited on the side of the magnetic field response portion, i.e., the portion of the MR film between the pair of the leads is the magnetic field response portion. The lead layer respectively provides multi-stage tapered portions, comprising a first tapered portion having a steep angle with respect to the MR film surface, and a second tapered portion having a shallow angle with respect to the MR film surface and provided continuously with the first tapered portion.

According to the present invention, since the distance between the lead layers can be accurately defined due to the first taper part having a steep angle, it is easy to obtain a reduced track width with good reproducibility. Further, due to the second tapered part having a shallow angle, the lead layers can be electrically sufficiently insulated from the upper magnetic shield layer even though using a thinner gap layer. Reduction in track width and reduction in gap width can, therefore, be achieved without risk of impairment of the electrical insulation between the lead layers and a shield layer.

DETAILED DESCRIPTION OF THE PREFERRED EMBODIMENTS

An embodiment of the invention is described below.

Figure 1:
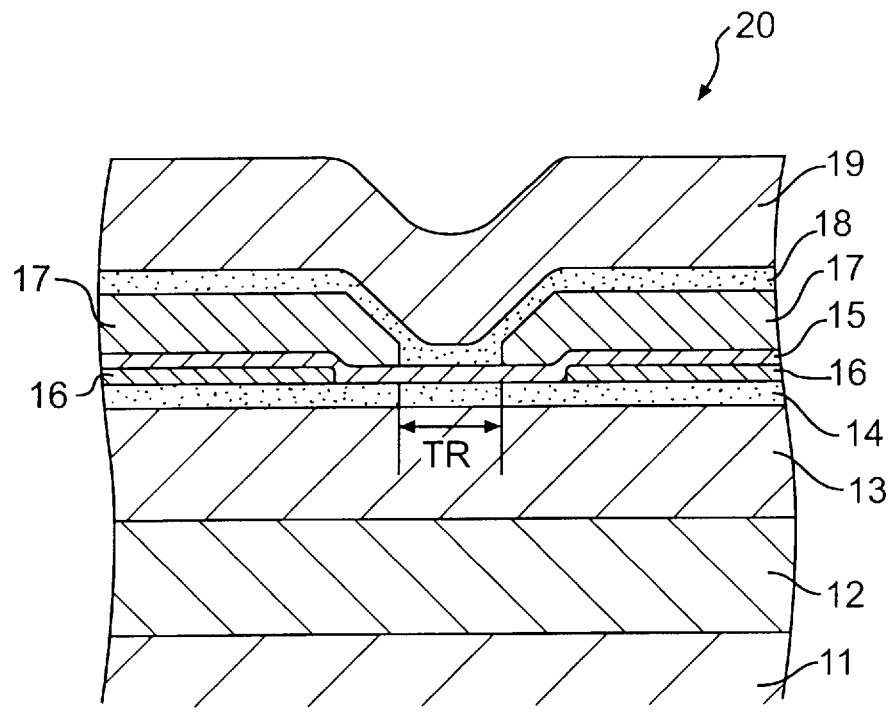
FIG. 1 is a cross-sectional view showing the construction of a shield type MR head according to an embodiment of this invention.

FIG. 1 is a cross-sectional view seen from the side opposite the medium, of the construction of a shield-type MR head according to an embodiment of the present invention. In FIG. 1, a substrate 11 comprises, for example, an Al2O3·TiC substrate (hereinafter referred to as an "ALTIC" substrate). An underlayer 12 of an insulator layer comprising, for example, about 10 μm of alumina film is provided on the substrate 11.

A lower magnetic shield layer 13 (a first magnetic shield layer) is made of soft magnetic material, for example, about 1 to about 2 μm of a NiFe alloy or a CoZrNb amorphous alloy. A lower reading magnetic gap film 14 (a first magnetic gap film) of non-magnetic insulator material, for example, about 150 nm of alumina, is provided on the lower magnetic shield layer 13. A magnetoresistive film (MR film) 15 is provided on the lower reading magnetic gap film 14.

The MR film may comprise an anisotropic magnetoresistive (AMR) material such as Ni80Fe20 (permalloy) or the like, whose electrical resistance varies depending on the angle that the direction of the sensing current makes with the magnetization moment of a magnetic layer.

Further, the MR film may comprise a giant magnetoresistive multi-layer such as a spin valve film or an artificial lattice film. The detail is shown in U.S. Pat. No. 5,493,465, the disclosure of which is hereby incorporated by reference. A GMR film comprises a multi-layer of ferromagnetic layers and a non-magnetic conductive layer inserted between the ferromagnetic layers, such as Co90Fe10/Cu/Co90Fe10 showing the so-called spin valve effect, whose electrical resistance varies depending on the angles made by the magnetizations of each magnetic layer. The ferromagnetic layer may comprise Ni, Fe and Co, and a ferromagnetic alloy such as a FeNi alloy, a CoFe alloy (for example, Co$_x$Fe$_x$: 5<x<40) or CoFeNi alloy. The alloy may further comprise other elements. The thickness of the ferromagnetic layer may be between about 1 nm and about 20 nm. The nonmagnetic conductive layer may comprise Cu, Au, Ag, Pt, Pd, Ru, Rh, Ir, a CuPd alloy, a CuAu alloy or CuPt alloy. The thickness of the nonmagnetic conductive layer may be between about 0.5 nm and about 20 nm. Concerning the artificial lattice film type, the electrical resistance also varies depending on the angles made by the magnetizations of each ferromagnetic layer. Concerning the spin valve type, ferromagnetic layers facing one another through the nonmagnetic layer are not substantially magnetically coupled. On the other hand, concerning the artificial lattice film type, ferromagnetic layers facing one another through a nonmagnetic layer are magnetically coupled, i.e., antiferromagnetically coupled.

The MR film 15 is formed such that the direction of its stripes is approximately parallel to the surface facing a recording medium.

A magnetic bias layer 16 is provided between the lower reading magnetic gap film 14 and the MR film 15 on the outside of the magnetic field response portion. The magnetic bias layer applies a biasing magnetic field to the MR film 15. The magnetic bias layer 16 may comprise hard magnetic film or antiferromagnetic film such as CoPt film.

A pair of lead layers 17 composed of a good-conductor is provided on the MR film 15 film in order to supply sensing current to the MR film 15. The reading track width (TR) of the MR film 15 can be defined by the pair of leads 17. That is, the magnetic field response portion of the MR film 15 is defined by the distance between the leads 17.

An upper reading magnetic gap film 18 (a second magnetic gap film) is provided on the MR film 15 and the pair of leads 17. The upper reading magnetic gap film 18 is comprised of a nonmagnetic insulator and may be comprised of the same nonmagnetic insulator as the lower reading magnetic gap film 14.

An upper magnetic shield layer 19 (a second magnetic shield layer) of soft magnetic material, identical to the material of the lower magnetic shielding layer 13, is on the upper reading magnetic gap film 18. However, the upper magnetic shield layer may comprise a different material. This structure constitutes a shield type MR head 20.

Figure 15:
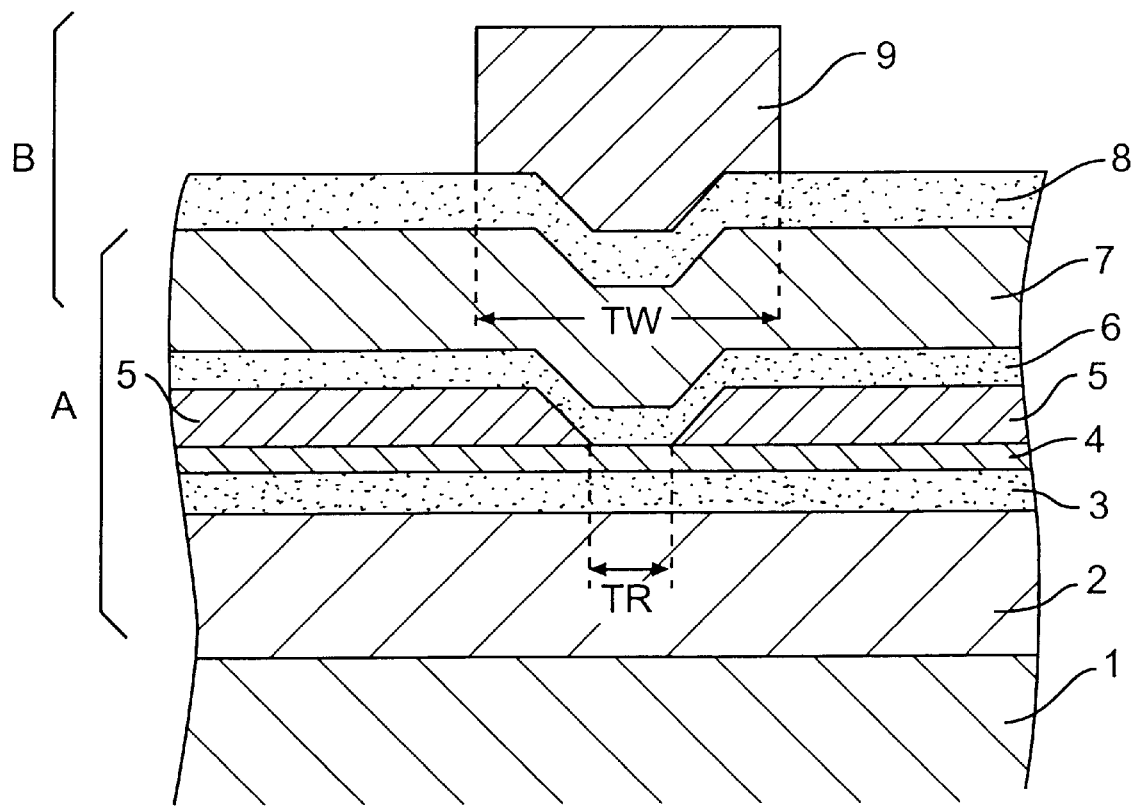
FIG. 15 is a cross-sectional view showing the construction of a conventional magnetic recording/reading head using a shield type MR head.

Incidentally, it should be noted that a magnetic recording/ reading head can be constituted by forming an inductive recording head in the same way as in FIG. 15 on the upper side of this shield type MR head 20. In such a case, the upper magnetic shield layer 19 will also serve as a lower recording magnetic pole of the inductive recording head.

Figure 2:
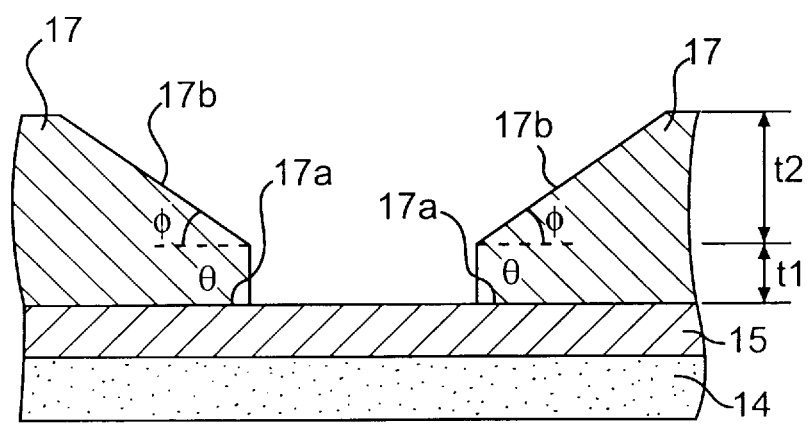
FIG. 2 is a detailed cross-sectional view of the shield type MR head shown in FIG. 1.
Figure 3A:
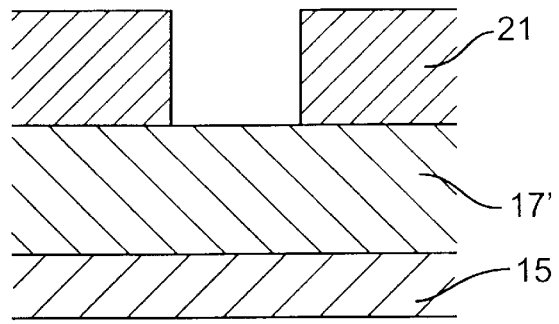
FIGS. 3(a), 3(b), 3(c) and 3(d) are cross-sectional views showing an example of the formation process of the multi-stage tapered leads of the shield type MR head shown in FIG. 1.
Figure 3B:
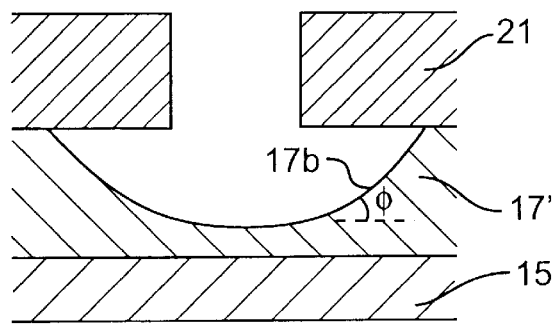
Figure 3C:
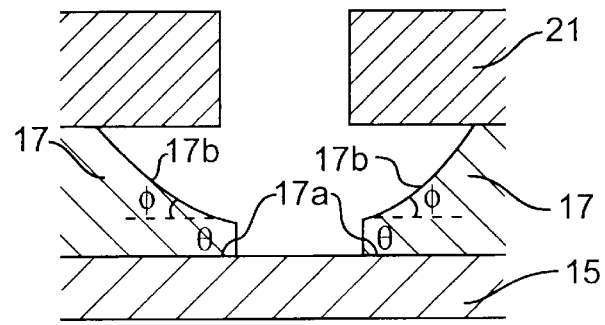
Figure 3D:
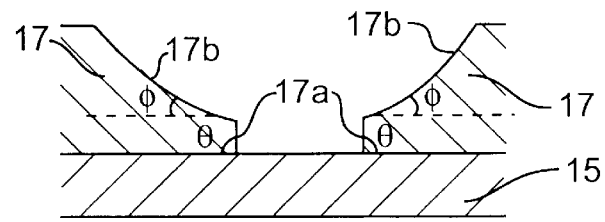

At the edges of the pair of lead layers 17 on the side nearest the magnetic field response portion, as shown in FIG. 2, a multi-stage tapered portion is provided. The multi-stage tapered portion comprises a first tapered portion 17*a* having an angle θ (a first angle) at the side of the MR film 15, and a second tapered portion 17*b* having an angle φ (a second angle) provided continuously from the first tapered portion 17*a*. The slope corresponding to the angle θ is steeper than the slope corresponding to the angle φ. Therefore, the first tapered portion 17*a* is called the steep portion, and the second tapered portion 17*b* is called the shallow tapered portion.

More specifically, the edge face constituting the first taper portion 17*a* is formed with a steep angle θ with respect to the surface of the MR film 15, while the edge face constituting the second tapered portion 17*b* is formed with a shallow angle φ with respect to the surface of the MR film 15.

The second tapered portion 17*b* may have an angle φ that is shallow with respect to the surface of MR film 15, and can have a linear surface as shown in FIG. 2 or a curved surface. Alternatively, the second tapered portion 17*b* may itself have a multi-stage tapered construction. Thus, the edge portions of lead layers 17 on the side nearest the magnetic field response portion are constituted by a multi-stage tapered portion in which these first and second tapered portions 17*a* and 17*b* are formed continuously with each other.

In leads wherein a multi-stage tapered portion as described above is provided at the edge portion on the side nearest the magnetic field response portion (hereinafter called multi-stage tapered leads) 17, a reading track width TR is defined by the first tapered portion 17*a* that has a steep angle θ, for example, close to perpendicular, with respect to the surface of the MR film 15. Accordingly, a reduced reading track width TR of, for example, about one to two microns or less, can therefore be defined strictly and with good reproducibility.

On the other hand, electrical insulation between the upper magnetic shield layer 19 and the lead layers 17 can be fully ensured by means of the second tapered portion 17*b* having a shallow angle φ. Thus, by forming a multi-step tapered portion at the edge portion on the side nearest the magnetic field response portion of the leads 17, it is possible to meet the demands imposed by the reduction of the gap width and, in addition, to precisely define the reading track width TR.

In order to enable the reading track width TR to be accurately defined when track width is reduced, it is desirable that the angle θ of the first tapered portion 17*a* is preferably within the range of about 45° to about 90°.

In contrast, the angle φ of the second tapered portion 17*b* is smaller than the angle θ and is preferably within the range of about 10° to about 60°, in order to obtain good step coverage by the thin upper reading magnetic gap film 18, or, in other words, in order to prevent failure of electrical insulation between the lead layers 17 and upper magnetic shield layer 19.

Also, regarding the thickness t1 of the portion of the lead layer 17 corresponding to the first tapered portion 17*a*, it is desirable that this should be set so as to satisfy RA <RMR, wherein RA represents the sheet resistance of this portion of thickness t1 and RMA represents the sheet resistance of the MR film 15. For example, if the lead layers 17 of resistivity 10 Ω·cm are formed on the M film 15 of the sheet resistance RMR about 10/square, the thickness t1 of the portion of leads 17 corresponding to the first tapered portion 17*a* is preferably made larger than about 10 nm, which satisfies the relationship RA<RMR.

By specifying the thickness t1 of the first tapered portion 17*a* in this way, the effective reading track width TR does not widen beyond the separation of lead layers 17, because the sheet resistance value of the multi-stage tapered lead layers 17 is larger at any portion than the sheet resistance value of the MR film 15. This makes it possible to control the reading track width TR more accurately.

Furthermore, offset of the current center of the film thickness direction between the central portion and the edge portions of the magnetic field response portion can be prevented by making the thickness t1 of the first tapered portion 17*a* as thin as possible within the range satisfying the above relationship. The thickness t2 of the second tapered portion 17*b*, which is larger than the thickness ti, may be suitably set such that the necessary conductivity of leads 17 is obtained. A large value of t2/t1 is preferable since this enables step coverage of the gap film to be improved.

The multi-stage tapered lead layers 17, as described above, can be formed, for example, as follows. A method of forming a multi-stage tapered portion at the edges of the lead layers 17 nearest the magnetic field response portion will be described with reference to FIG. 3.

Good-conductivity film 17' constituting the lead layers 17 is formed on the MR film 15. An etching mask 21 is formed on the good-conductivity film having a planar shape of the leads 17 (FIG. 3(*a*)). Next, in order to form the second tapered portion 17*b* having a shallow angle φ, the good-conductivity film 17' is first etched by a method whereby etching proceeds isotropically (isotropic etching), in such a manner as to produce undercut at the lower face side of the etching mask 21, for example. As shown in FIG. 3(*b*), a second tapered portion 17*b*, having a shallow angle φ is formed by isotropic etching of good-conductivity film 17'.

A method of chemical dry etching (CDE) using a reactive plasma may be applied as a method for achieving isotropic etching as described above. Wet etching may also be employed if control of the etching rate and capability to etch narrow patterns can be provided. Ion milling or focused ionic beam etching are not necessarily excluded as taper etching, and can be adopted only if it is possible to fix the mask manufacturing conditions and etching conditions.

Next, the portions of the good-conductor film 17' left by the isotropic etching described above are etched by a method whereby anisotropic etching can be performed, thus forming the first tapered portion 17*a* that has a steep angle θ, defining the distance of the leads 17, and exposing the surface of the MR film 15 (FIG. 3(*c*)).

In this process, it is desirable that over-milling should be suppressed as far as possible. Reactive ion etching (RIE) may be used to carry out anisotropic etching, which is successful in anisotropic etching in semiconductor processing. Ion milling or focused ion beam etching (FIB) and the like may be used. However, since ion milling or FIB methods are physical etching methods, they are inferior in comparison with RIE, which also has a chemical etching effect, in regard to material selectivity. The RIE is preferable in the view of minimizing over-milling of the MR film 15.

After these two etching processes, the multi-stage tapered lead layers 17 having multi-stage tapered portions at the edges nearest the magnetic field response portion are obtained by removing the etching mask 21 (FIG. 3(*d*)).

The etching mask 21 may be a single mask for an isotropic etching mask and an anisotropic etching mask. If the masks for isotropic etching and anisotropic etching are combined, conditions in isotropic etching should be selected such that the etching mask retreats as little as possible, and undercut is produced at the under surface of the mask.

The etching mask 21 may be removed after isotropic etching, and another mask may be formed, which can strictly define the separation between lead layers 17. After that, anisotropic etching is then performed. However, from the point of view of simplifying the etching step, it is preferable to complete lead patterning with a single mask.

There are no particular restrictions on the specific material to be used for the etching mask 21, and various materials such as resist, carbon, silicon oxide, aluminum oxide, silicon nitride, or aluminum nitride may be employed. When a material other than a resist is employed, for example, a silicon oxide film, a patterning resist of the desired shape of the leads is formed after continuous deposition of silicon oxide film and good-conductor film 17' on the MR film 15, and the silicon oxide film is patterned using the patterning resist as a mask. Patterning of the good-conductor film 17' is then performed using this patterned silicon oxide film as mask. If the film thickness of the silicon oxide film is set such that the silicon oxide film that was used as the mask has disappeared by the time the lead patterning is completed, deposition of the upper-side playback magnetic gap film 18 can be commenced immediately after completion of the lead patterning. The number of times the MR film 15 is exposed to the wet process can thereby be reduced. Therefore, an anti-ferromagnetic film included in the MR film such as FeMn alloy of inferior corrosion resistance may be easily used.

The multi-stage tapered lead layers 17 may comprise a single metal or an alloy, such as Mo, W, Ta, Cu, Al, Nb, Ti, Au, Pt, Cr, or alloys or compounds of these such as MoTa alloy or MoW alloy and the like. Also, multi-stage tapered leads 17 may be formed as a plurality of laminated layers of different materials. When manufacturing multi-stage tapered lead layers 17 by a laminated film in this fashion, it is preferable to use a film of material that is easily etched isotropically on top and a film of material that is easily etched anisotropically on the side of the MR film 15.

Also, when employing a laminated film as multi-stage tapered lead layers 17 and performing lead patterning by CDE and RIE, it is preferable to form this laminated film on the MR film 15 in an order starting with a film of lower etching rate in CDE and then adding films with higher etching rates. According to this order, the CDE etching rate is faster for the film closer to etching mask 21. Therefore, undercutting to the under surface of the etching mask 21 is facilitated and it becomes easy to produce a shallow taper angle φ of about 45° or less, for example. The same applies in the case of other etching methods.

A specific method of manufacturing a shield type MR head 20 in accordance with the embodiments described above will now be explained.

A first method of manufacture will be described with reference to FIGS. 4(*a*)–4(*e*).

An alumina insulator film 12 of thickness about 10 μm is formed as an underlying film on an ALTIC substrate 11. A lower magnetic shielding layer 13 of a CoZrNb amorphous alloy film of thickness about 1.5 μm is formed on the alumina insulator underlying film 12, using, for example, a sputtering method.

After forming a lower reading magnetic gap film 14 of an alumina film of thickness about 150 nm, biasing magnetic field-generating films 16 of the prescribed shape are formed by depositing a hard magnetic film of a CoPt film or the like at thickness about 20 nm and subjecting this to patterning by, for example, ion milling.

Formation and patterning of an MR film 15 are performed thereon. After that, an Mo film of thickness about 100 nm as a good-conductive film 17' is deposited thereon to constitute lead layers 17. A resist 22 is then formed to constitute an etching mask along the planar shape of lead layers 17 on the Mo film (FIG. 4(*a*)). Steps up to this step are not shown in FIG. 4(*a*).

A second tapered portion 17*b* is formed by isotropic etching of the Mo film to a prescribed depth with CDE using a mixture of CF4 and O2 gases. Using the remaining resist 22 as mask, anisotropic etching is then performed on the remaining parts of the Mo film with RIE using mixed CF4 and O2 gas, thereby forming a first tapered portion 17*a* and thus obtaining multi-stage tapered lead layers 17 (FIG. 4(*b*)).

After removal of the resist 22, an upper-side reading magnetic gap film 18 of an alumina film of thickness about 150 nm is formed on top of the MR film 15 comprising a magnetic field response portion and pair of lead layers 17. After that, an upper-side magnetic shield layer 19 of a CoZrNb amorphous alloy film about 1.5 μm thick is formed thereon. Accordingly, a shield type MR head 20 is completed (FIG. 4(c)).

Figure 4A:
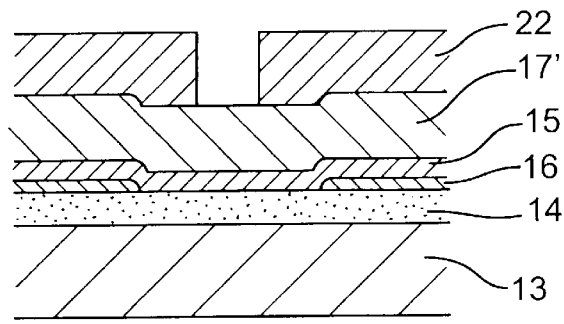
FIGS. 4(a), 4(b), 4(c), 4(d) and 4(e) are cross-sectional views showing an example of a manufacturing process for a shield type MR head shown in FIG. 1.
Figure 4B:
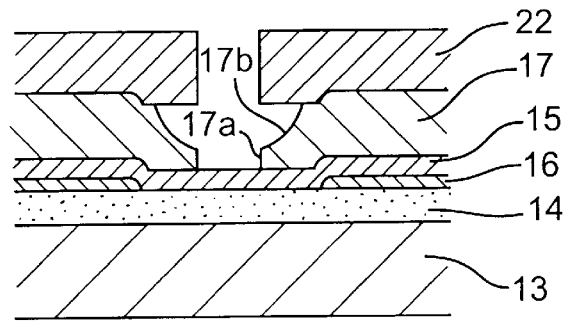
Figure 4C:
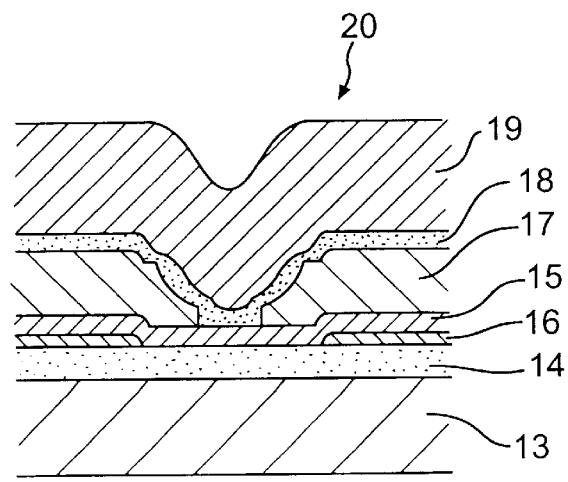
Figure 4D:
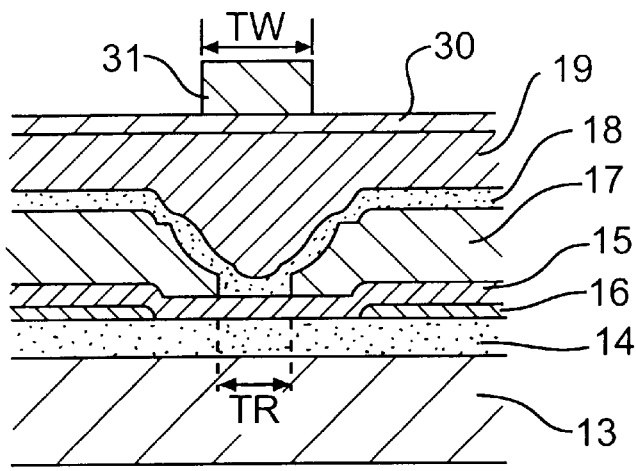

When a recording/reading head is produced, an inductive coil as a recording head may be formed on the shield type MR head 20, as shown in FIG. 4(d). The upper magnetic shield layer 19 also serves as a lower recording magnetic pole of an inductive recording head.

Figure 4E:
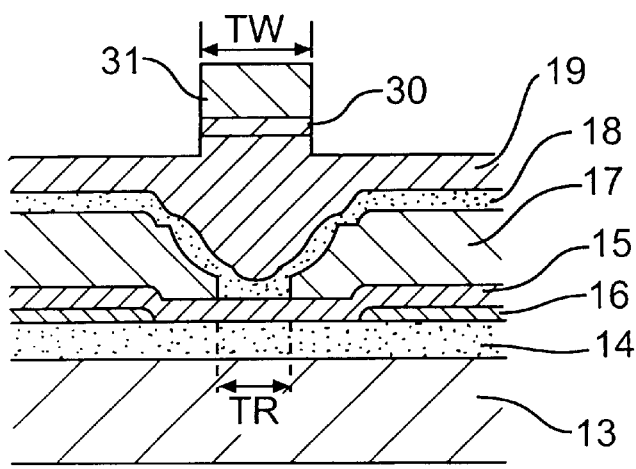

For example, after flattening the surface of the upper-side magnetic shield layer 19 with, for example, an etching method, a recording magnetic gap film 30 of, for example, alumina, is formed on the upper-side magnetic shield layer 19. A recording coil is formed at the rear, though not shown in the drawings. An upper recording magnetic pole 31 is formed on the recording magnetic gap film 8, thereby constituting an inductive recording head. Since the track width (TR) of a reading head (a shield-type MR head), is typically made narrower than the track width (TW) of the inductive recording head, because of SIN considerations, the width of the upper recording magnetic pole 31 is preferably smaller than TR, as shown in FIG. 4(d). Also, the lower recording magnetic pole may have a pole portion as a protuberance under the upper recording magnetic pole 31, as shown in FIG. 4(e). In this case, the upper and lower poles and magnetic gap may be preapared in a trench formed in an insulator layer.

Lead materials that can be processed by the manufacturing step described above may include W, Ta, Nb, MoTa alloy, and MoW alloy and the like. Also, multi-stage tapered leads 17 consisting of for example MoW alloy film and another good conductor can be obtained by combining CDE employing CF4 gas and ion milling with the same resist.

Figure 5A:
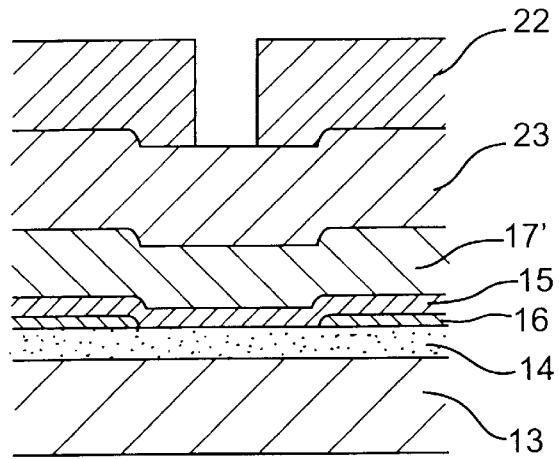
FIGS. 5(a), 5(b) and 5(c) are cross-sectional views showing an example of another manufacturing process for a shield type MR head shown in FIG. 1.
Figure 5B:
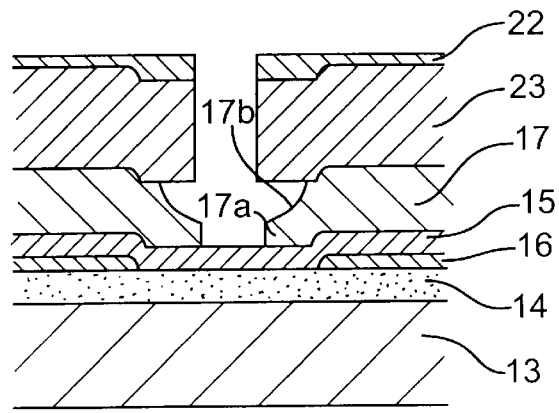
Figure 5C:
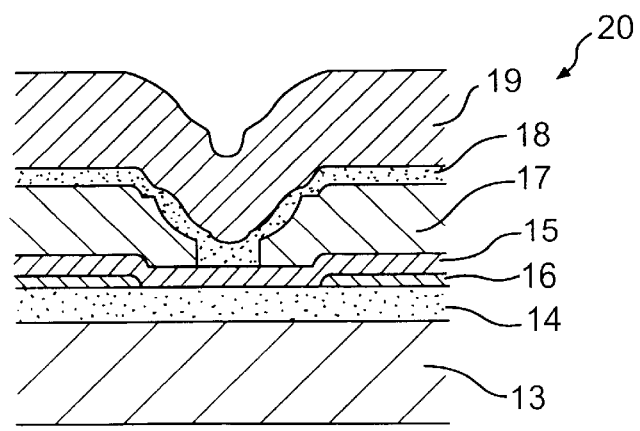

A second method of manufacture will be described with reference to FIGS. 5(a)–5(c).

In the same way as in the first method described above, an alumina insulating underlying film 12, a lower magnetic shielding layer 13, a lower reading magnetic gap film 14, a biasing magnetic field generating film 16 and an MR film 15 are successively formed.

A W film of thickness about 200 nm as a good-conductor film 17' is formed thereon. An alumina film 23 of thickness about 300 nm, that is used as an etching mask is deposited on the film 17'. A resist 22 is then formed along the planar shape of lead layers 17 on this alumina film 23 (FIG. 5(a)).

Using resist 22 as a mask, the alumina film 23 is pattered as an etching mask of the good-conductor film 17' by RIE employing, for example, CF4 gas, C12 gas, BC13 gas, or Ar gas. After that, a second tapered portion 17b is formed by etching the W film to the prescribed depth with taper etching carried out by ion milling, with the patterned alumina film 23 used as mask. Next, the first tapered portion 17a is formed by anisotropic etching of the remaining portions of the W film by RIE using mixed CF4 and 02 gas, with the alumina film 23 as a mask, so as to obtain the multi-stage tapered lead layers 17 (FIG. 5(b)).

After removing alumina film 23 that had served as an etching mask, in the same way as the first method described above, a shield type MR head 20 is obtained by successively forming an upper-side reading magnetic gap film 18 and an upper-side magnetic shield layer 19.

If the thickness of the alumina film 23 is selected so that the whole alumina film 23 is etched at the time the lead is patterned, the removing step is not required. Therefore, after patterning the lead, an upper-side reading magnetic gap film 18 and an upper-side magnetic shield layer 19 can be formed, immediately.

A third method of manufacture will be described with reference to FIGS. 6(a)–6(d).

In the same way as in the first method described above, an alumina insulating underlying film 12, a lower magnetic shielding layer 13, a lower reading magnetic gap film 14, a biasing magnetic field generating film 16 and an MR film 15 are successively formed.

Figure 6A:
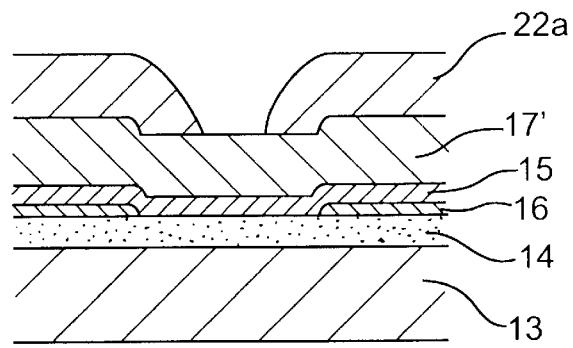
FIGS. 6(a), 6(b), 6(c) and 6(d) are cross-sectional views showing yet another example of a manufacturing process for a shield type MR head shown in FIG. 1.

A Ta film of a thickness of about 240 nm as a good-conductor film 17', and a first resist 22a is formed along the planar shape of lead layers 17 (FIG. 6(a)). Since this first resist 22a is only employed as a mask in CDE, strict accuracy of its shape is not necessarily required, and even a resist that retreats somewhat during the CDE may be employed.

Figure 6B:
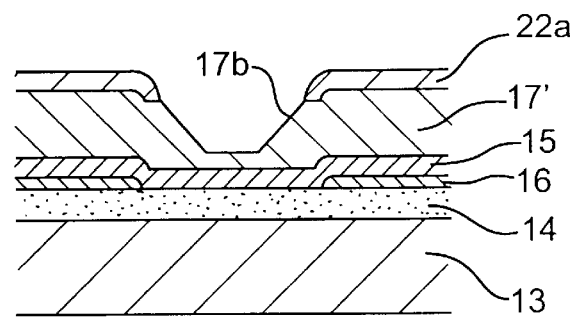
Figure 6C:
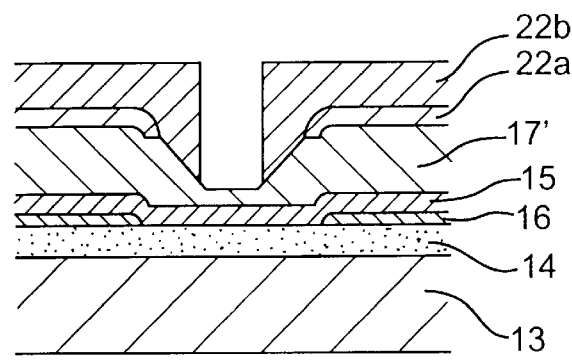
Figure 6D:
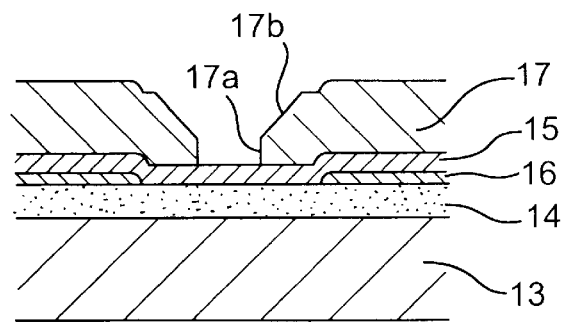

Using first resist 22a as a mask, a second tapered portion 17b is formed by isotropic etching of the Ta film to the prescribed depth by CDE (FIG. 6(b)). Next, a second resist 22b of the same shape as the first resist 22a is formed (FIG. 6(c)). Using this second resist 22b as mask, a first tapered portion 17a is formed by anisotropic etching of the remaining parts of the Ta film by RIE using CF4 and 02 mixed gas. The resist is then removed and a multi-stage tapered lead layers 17 obtained (FIG. 6(d)).

After that, in the same way as the first and second methods described above, a shield type MR head 20 is obtained by successively forming an upper-side reading magnetic gap film 18 and an upper-side magnetic shielding layer 19. These steps are not illustrated in FIG. 6.

Next, a fourth method of manufacture employing a good-conductor film consisting of two laminated films (24a/24b) for lead layers 17 will be described with reference to FIGS. 7(a)–7(d).

In the same way as in the first method described above, an alumina insulating underlying film 12, a lower magnetic shield layer 13, a lower reading magnetic gap film 14, a biasing magnetic field generating film 16 and an MR film 15 are successively formed.

An Al film of about 30 nm as a first good-conductor film 24a is deposited thereon and, then, a second good-conductor film 24b of a Mo film of about 130 nm is deposited. A resist 22 along the planar shape of lead layers 17 is deposited thereon (FIG. 7(a)).

Figure 7A:
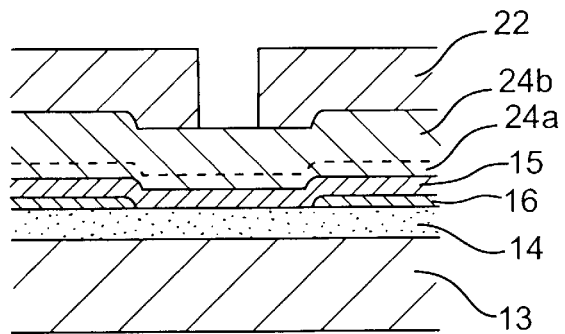
FIGS. 7(a), 7(b), 7(c) and 7(d) are cross-sectional views showing an example of a manufacturing process when leads consisting of double-layer laminated film are employed for the shield type MR head shown in FIG. 1.
Figure 7B:
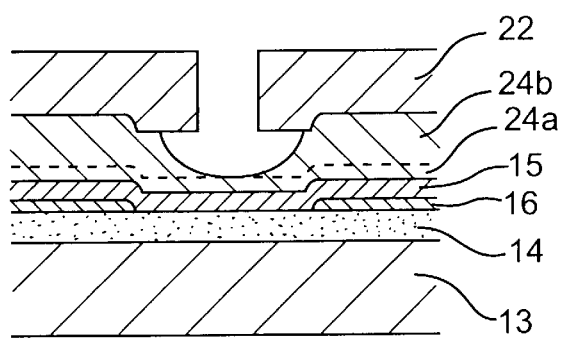
Figure 7C:
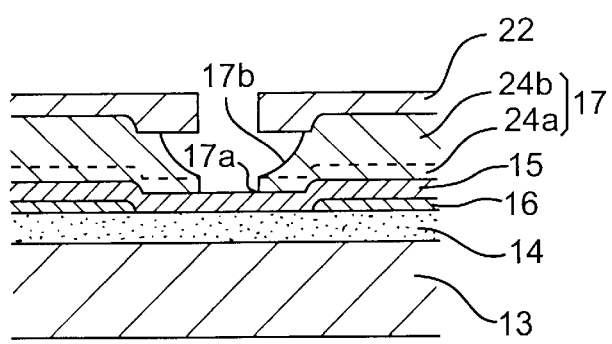
Figure 7D:
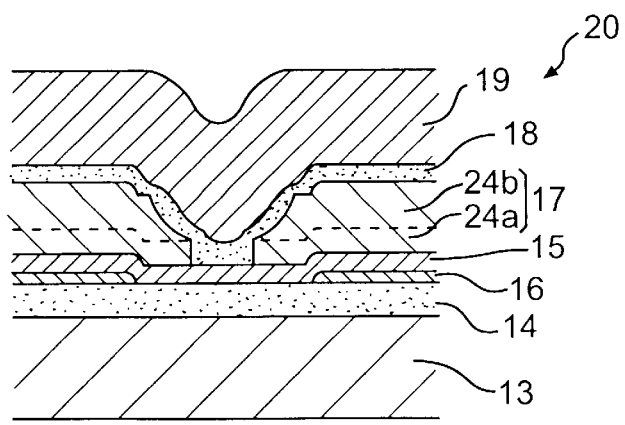

A second tapered portion 17b is formed by isotropic etching of the Mo film 24b by CDE using CF4 gas with a resist 22 as mask (FIG. 7(b)). A first tapered portion 17a is formed by anisotropic etching of the Al film 24a by RIE using Cl-based gas with the remaining resist 22 as mask (FIG. 7(c)).

After removing the resist 22, in the same way as the first and second methods described above, a shield type MR head 20 is obtained by successively forming an upper-side reading magnetic gap film 18 and an upper-side magnetic shield layer 19.

Leads consisting of two laminated films (24a/24b) may include: Al/W, Al/Nb, Al/Ti, Al/Pt, Al/MoW, Al/MoTa, Al/MoSi2, Al/WSi2, Al/TSiO2, Cr/Mo, Cr/W, Cr/Nb, Cr/Ti, Cr/Pt, Cr/MoW, Cr/MoTa, Cr/MoSi2, Cr/WSi2, Cr/TaSi2, Au/Mo, Au/W, Au/Nb, Au/Ti, Au/Pt, Au/MoW, Au/MoTa, Au/MoSi2, Au/WSi2, and Au/TaSi2.

Patterning of leads consisting of two such laminated films under various conditions can also be performed by using a combination of CDE using mixed CF4 plus 02 gas and RIE using CF4 gas. For example, by combining CDE using CF4 plus 02 mixed gas and RIE using CF4 gas, laminated films of W/Mo, Nb/Mo, Ti/Mo, Ti/Nb, Ti/W, Ti/MoTa, Ti/MoW, MoTa/MoW, Nb/W, Ta/Mo, Ta/Nb, Ta/W, Ta/MoTa, or Ta/MoW, etc. can be satisfactorily processed.

Figure 8A:
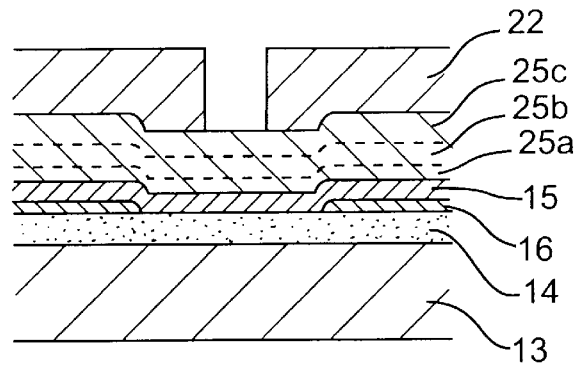
FIGS. 8(a), 8(b) and 8(c) are cross-sectional views showing an example of a manufacturing process when leads are used consisting of a triple-layer laminated film for the shield type MR head shown in FIG. 1.

A fifth method of manufacturing wherein good-conductor film consisting of three laminated films (25a/25b/25c) is employed for the leads will be described with reference to FIGS. 8(a)–(c).

In the same way as in the first method described above, an alumina insulating underlying film 12, a lower magnetic shielding layer 13, a lower reading magnetic gap film 14, a biasing magnetic field generating film 16 and an MR film 15 are successively formed.

A Nb film of a thickness of about 80 nm as a first good-conductor film 25a, a W film of about 60 nm thick as a second good-conductor film 25b, and a Mo film of about 100 nm thick as a third good-conductor film 25c are deposited thereon. A resist 22 is then formed along the planar shape of lead layers 17 thereon (FIG. 8(a)).

A second tapered portion 17b is formed by isotropic etching to a depth of about 160 nm by CDE using mixed CF4 and 02-based gas, employing resist 22 as a mask. In this process, the CDE conditions such as the gas partial pressure ratio, gas pressure, substrate temperature, and gas flow rate are set such as to satisfy the relationship: rNb <rW<rMo of the etching rates, where rNb is the etching rate of the Nb film, rW is the etching rate of the W film, and rMo is the etching rate of the Mo film, when performing etching of the respective single layers of the Nb film, W film and Mo film.

Figure 8B:
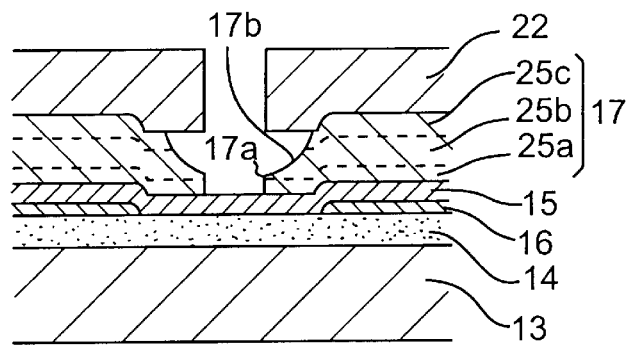
Figure 8C:
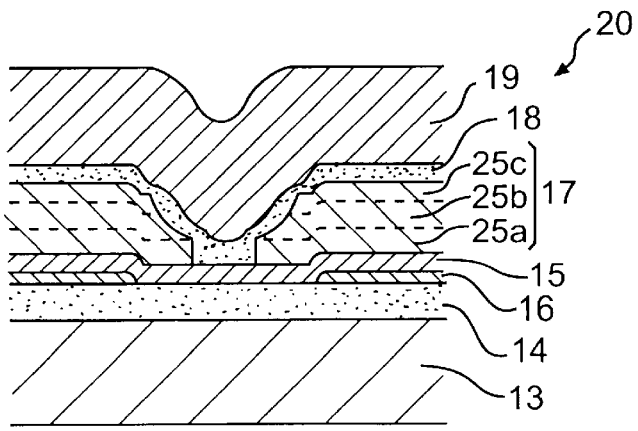

After that, a first tapered portion 17a is formed by anisotropic etching of the remaining Nb film by RIE using CF4 and employing the remaining resist 22 as a mask (FIG. 8(b)).

After removing the resist 22, a shield type MR head 20 is obtained by successively forming an upper reading magnetic gap film 18 and an upper magnetic shield layer 19 in the same way as in the manufacturing process examples described above.

Lead layers including three-laminated layer films (25a/25b/25c) that can be processed by the manufacturing steps described above include: Ti/W/Mo, Ta/W/Mo, Ti/MoTa/MoW, Ta/MoTa/MoW, Ti/MoW/MoTa, Ta/MoW/MoTa, Ti/Nb/Mo, and Ti/Nb/W. Also, by RIE using Cl2 for anisotropic etching instead of RIE using F-based gas, a multi-stage tapered portion can be satisfactorily formed at the edges of the three-laminated layer film of Al/W/Mo, Al/Nb/Mo, Cr/Nb/Mo, Cr/W/Mo, Au/Nb/Mo, Au/W/Mo, Al/MoTa/MoW, Cr/MoTa/MoW, or Au/MoTa/MoW etc. in the same way.

Also, even if, for example, ion milling is employed as taper etching, a multi-stage tapered portion may easily be formed at the edges of the leads by employing three-layer laminated film that is laminated from the side of the MR film 15 in an order in which the milling rate of the laminated layers gets faster.

Figure 9:
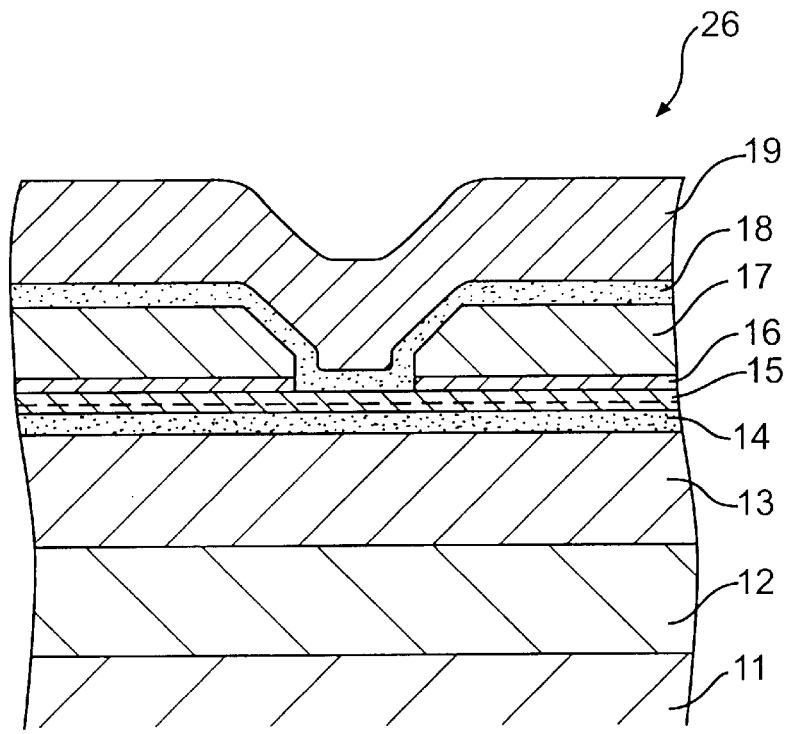
FIG. 9 is a cross-sectional view showing the construction of a shield type MR head according to another embodiment of this invention.

A shield type MR head according to another embodiment of this invention will be described with reference to FIG. 9. In a shield type MR head 26 shown in FIG. 9, an MR film 15 is directly formed on a lower reading magnetic gap film 14. Further, biasing magnetic field generating films 16 provided with electrical conductivity are formed on the MR film 15, which are patterned so as to define the reading track width.

Figure 10:
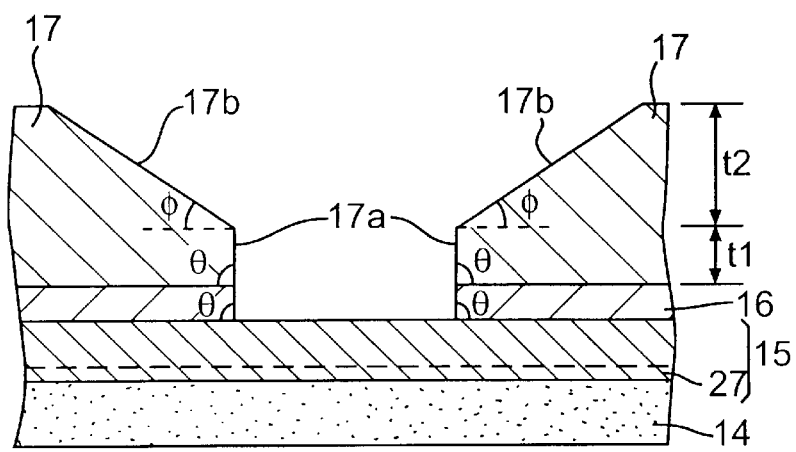
FIG. 10 is a detailed cross-sectional view of the shield type MR head shown in FIG. 9.

As shown in FIG. 10, a pair of good-conductor films (multi-stage tapered good-conductor films) 17 is formed on the biasing magnetic field generating films 16. In this case, the biasing magnetic field-generating films 16 and good-conductor film 17, in combination, function as leads. The rest of the constructional details are the same as in the construction of a shield type MR head 20 of the embodiments described above.

A shield type MR head 26 shown in FIG. 10 may be suitable for a spin valve film comprising an anti-ferromagnetic film 27 of, for example, NiO as an MR film 15. Since, with this construction, a biasing magnetic field generating film 16 and a first tapered portion of a multi-stage tapered good-conductor films 17 can be formed in a single process, a reading track width TR can be strictly and reproducibly defined, even when this is made of reduced track width in the order of a micron. Furthermore, misalignment of the biasing magnetic field generating films 16 and the multi-stage tapered good-conductor film 17 can be prevented. In addition, electrical insulation between the good-conductor film 17 and the upper magnetic shielding layer 19 produced by the thin upper reading magnetic gap film 18, can be fully guaranteed due to the second tapered portion 17b having a shallow angle φ.

When a biasing magnetic field generating film 16 is arranged on an MR film 15 as described above, it is possible to permit the edge portion of a good-conductor film 17 to be somewhat further back than the edge portion of the biasing magnetic field generating film 16 nearest the reading track TR. However, even in this case, it is necessary to make the distance between the edge portion of the good-conductor film 17 and the edge portion of the biasing magnetic field generating film 16 very short and also precisely defined. With a multi-stage tapered good-conductor film 17, the distance between the edge portion of a good conductor film 17 and the edge portion of a biasing magnetic field generating film 16 can indeed be accurately defined.

Figure 11:
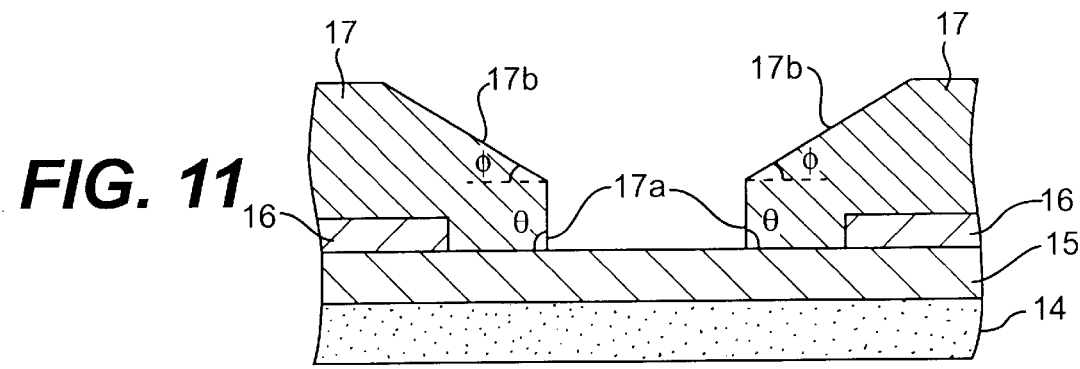
FIG. 11 is a detailed cross-sectional view showing a modified example of the shield type MR head shown in FIG. 9.

Also, when a biasing magnetic field generating film 16 of electrical conductive material and good-conductor film 17 are formed on MR film 15, and these are used as leads, the edge portion of the good-conductor film 17 may be arranged closer to the reading track TR than the edge portion of the biasing magnetic field generating film 16, as shown for example in FIG. 11. In this case, the multi-stage tapered portion constituted by a first tapered portion 17a and a second tapered portion 17b provided at the edge portion nearest reading track TR functions in the same way as in the case of the embodiments described above.

Figure 12A:
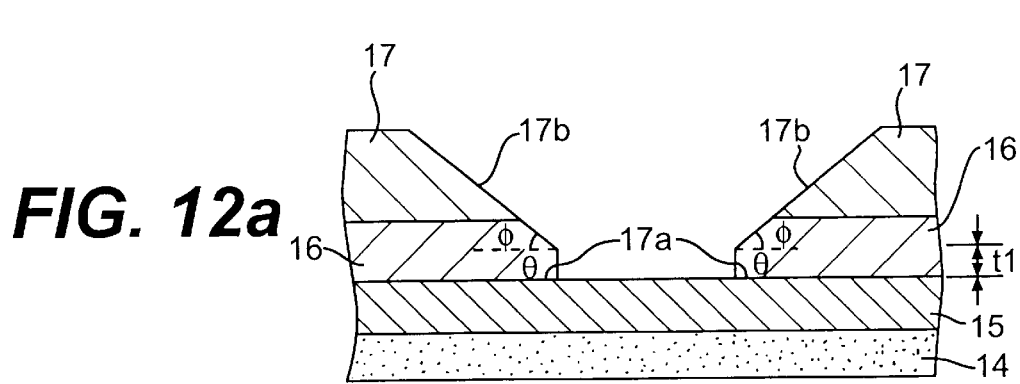
FIGS. 12(a), 12(b) and 12(c) are detailed cross-sectional views showing another example of a modification of the shield type MR head shown in FIG. 9.

Also, as shown in FIG. 12(a), the multi-stage tapered portion can be formed with respect to the edge portions nearest reading track TR of the laminated film of the biasing magnetic field generating film 16 and the good-conductor film 17. In other words, a biasing magnetic field generating film 16 and a good-conductor film 17 are regarded as a lead, and the multi-stage tapered portion may be formed in the lead.

Figure 12B:
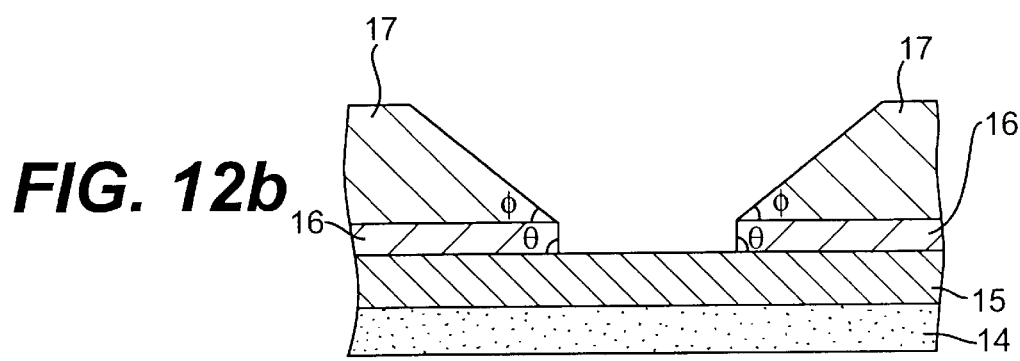

Concerning an embodiment in FIG. 12(a), a first tapered portion is in a biasing magnetic field generating film and a second tapered portion is in a biasing magnetic field generating film and a good-conductor film, continuously. However, as shown in FIG. 12(b), the first tapered portion 17a may be formed in a biasing magnetic field generating film 16, and the second tapered portion 17b may be formed in a good-conductor film separately. In this case, the reading track width TR is defined between the biasing magnetic field generating films 16. Also, a biasing magnetic field generating film 16 and a good-conductor film 17 are regarded as a lead.

Figure 12C:
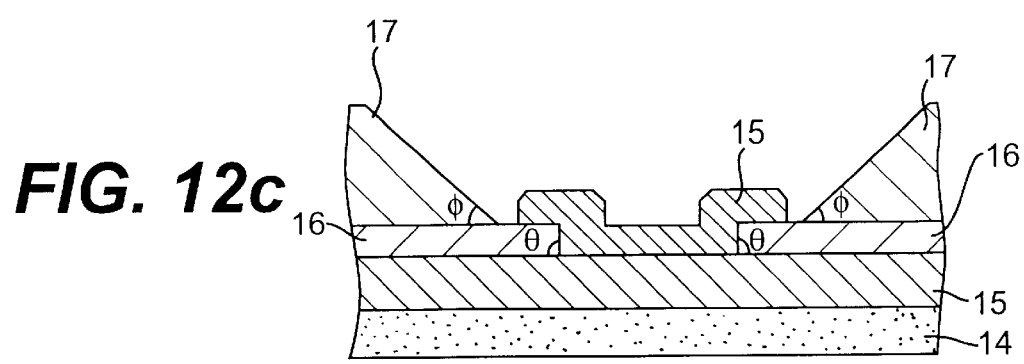

Further, a biasing magnetic field generating film may provide a flat surface so that an MR film is deposited on the surface, as shown in FIG. 12(c). In this case, since the edge portion of an MR film 15 may be formed on a flat surface, the MR film may be deposited stably. Further, an MR film is preferably not on the good-conductor film so as to prevent a signal magnetic field from being detected through the portion of the MR film on the good-conductor film, where a bias magnetic field is reduced.

Because the reading track width TR is defined between the biasing magnetic field generating films 16, if the good-conductor film is formed after the MR film 15 is patterned, the good-conductor film may be patterned with a lift-off method.

Concerning a shield type MR head 26 of this embodiment, the angle θ of the first tapered portion 17a, the angle φ of the second tapered portion 17b, the method of etching, and the material of the good-conductor film 17 may be the same as in the embodiments described above. However, regarding the thickness t1 of the first taper portion 17a, it is preferable to set t1 so as to satisfy RA'<RMR, where RA' is the sheet resistance of the laminated film of the biasing magnetic field generating film 16 and good conductor film 17; and RMR is the sheet resistance of the MR film 15. By doing this, the reading track width does not extend substantially further than between the edges of the biasing magnetic field generating film 16 or between the edges of the good-conductor film 17. The reading track width can therefore be accurately defined.

A multi-stage tapered good conductor film 17 formed on a biasing magnetic field generating film 16 as described above can be obtained for example as follows.

Figure 13A:
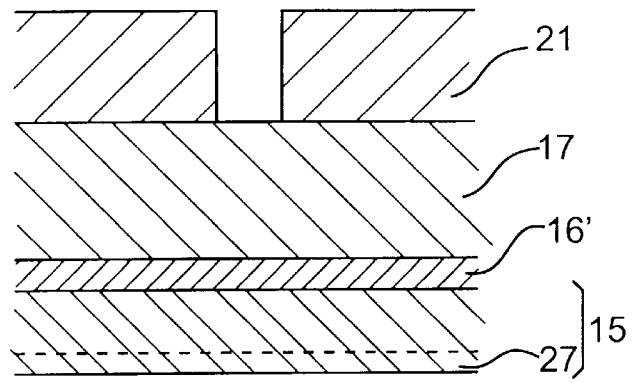
FIGS. 13(a), 13(b) and 13(c) are cross-sectional views showing an example of the processor formation of multi-stage tapered leads and biasing magnetic fields generating film of the shield type MR head shown in FIG. 9.

As shown in FIG. 13(a), a hard magnetic film 16' constituting biasing magnetic field generating film 16 and a good-conductor film 17 is deposited in succession on an MR film 15 of a spin valve film or the like containing anti-ferromagnetic film 27.

After that, an etching mask 21 along the planar shape (leads shape) of good-conductor film 17 is deposited.

Figure 13B:
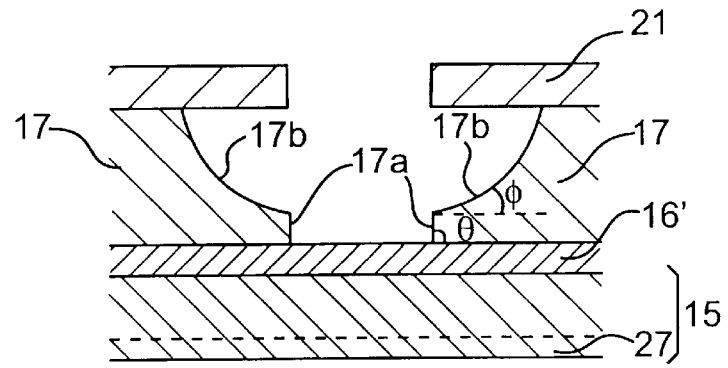

In order to form a second tapered portion 17b having a shallow angle φ, isotropic etching is performed so as to produce undercutting at the underface side of the etching mask 21. By anisotropic etching of the good-conductor film 17 portion left after the isotropic etching, a first tapered portion 17a having a steep angle θ is formed and defines the interval of good conductor film 17 so as to obtain a multi-stage tapered good-conductor film 17 (FIG. 13(b)).

Subsequently, the hard magnetic film 16' is patterned by anisotropic etching using the patterned good conductor film 17 as mask.

Figure 13C:
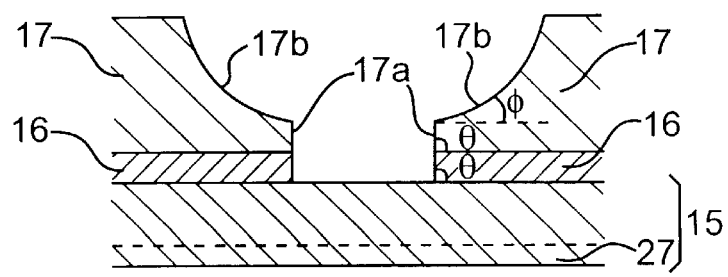
Figure 14A:
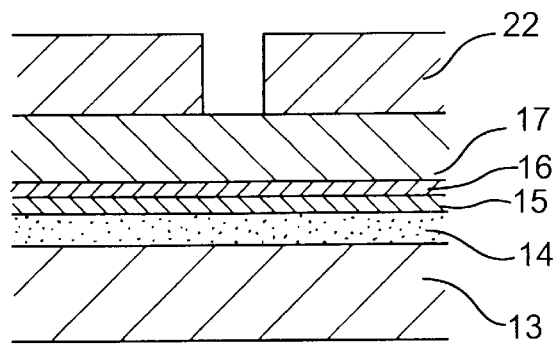
FIGS. 14(a), 14(b), 14(c) and 14(d) are cross-sectional views showing an example of a manufacturing process of a shield type MR head shown in FIG. 9.
Figure 14B:
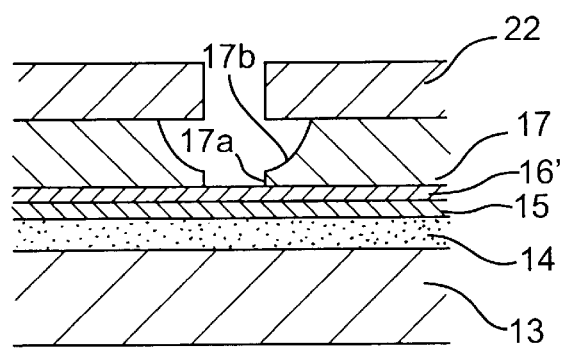
Figure 14C:
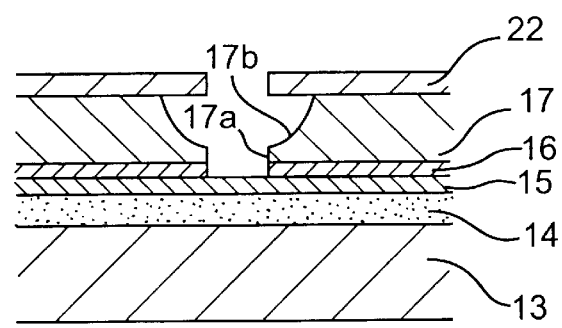
Figure 14D:
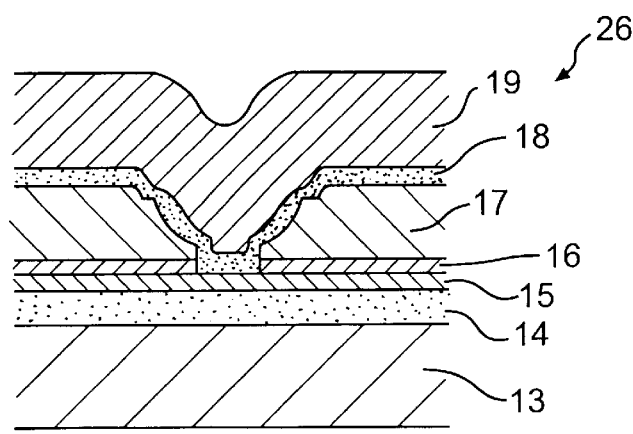

Removing the etching mask 21, the multi-stage tapered good conductor film 17 having multi-stage tapered portions at its edge portion nearest the reading track TR and biasing magnetic field generating film 16 that defines the reading track TR, is obtained (FIG. 13(c)).

According to the etching process described above, the number of steps can be reduced and the reading track width TR can be accurately defined. Also, misalignment of the biasing magnetic field generating film 16 and the multi-stage tapered good conductor film 17 can be prevented.

A specific method of manufacturing a shield type MR head 26 according to the embodiment described above will be explained with reference to FIGS. 14(a)–14(d).

An underlying film 12 of an alumina of thickness about 10 μm is formed on a substrate 11 of ALTIC. Steps previous to this are not illustrated in FIG. 14. On this underlying film 12, an amorphous alloy film of CoZrNb is formed as a lower magnetic shield layer 13 using, for example, a sputtering method.

After forming an alumina film about 150 nm thick as a lower reading magnetic gap film 14, an MR film 15 is formed and patterned. A hard magnetic film 16' of CoPt film or the like about 20 nm thick and a Mo film about 200 nm thick constituting good conductor film 17 are successively deposited. A resist 22 to constitute an etching mask is then formed along the lead planar shape on the Mo film (FIG. 14(a)).

Subsequently, a second tapered portion 17b is formed by isotropic etching to the prescribed depth of the Mo film by CDE using a mixed gas consisting of CF4 and O2. After that, a first tapered portion 17a is formed by anisotropic etching of the residual portions of the Mo film, by RIE, using a mixed gas of CF4 and O2 with this resist 22 as a mask, so as to form a multi-stage tapered good conductor film 17 (FIG. 14(b)). Successively, a biasing magnetic field generating film 16 is patterned by anisotropic etching of the hard magnetic film 16' by ion milling, using the same resist 22 as a mask.

After removing resist 22, a shield type MR head 26 is completed by forming as an upper reading magnetic gap film 18 an alumina film about 150 nm thick on the pair of good conductor films 17 and the MR film 15, and further forming an upper magnetic shield layer 19 of CoZrNb amorphous alloy film about 1.5 μm thick.

Various methods of manufacture illustrated in the embodiments described above can also be applied to the manufacture of the shield type MR head 26 of this embodiment.

As described above, according to the present invention, electrical insulation between the leads and the magnetic shield can be fully guaranteed even with a narrow gap film, and even a narrow track can be precisely defined. It is therefore possible to provide in stable fashion a shield type magnetoresistive head of narrow-gap, narrow-track construction adapted to high recording density systems.

It will be apparent to those skilled in the art that various modifications and variations can be made in the device of the present invention without departing from the spirit or scope of the invention. Thus, it is intended that the present invention covers the modifications and variations of the invention provided they come within the scope of the appended claims and their equivalents.

What we claim is:

1. A magnetoresistive transducer, comprising:
   a first magnetic shield layer;
   a first magnetic gap film on the first magnetic shield layer;
   a magnetoresistive film having a magnetic field response portion on the first magnetic gap film;
   a biasing magnetic field generating film on the first magnetic gap film so as to supply a magnetic bias field to the magnetoresistive film, wherein the biasing magnetic field generating film comprises a pair of biasing magnetic field generating films separated by a first distance;
   a pair of lead layers disposed on the magnetoresistive film, the lead layers each having a first tapered portion at the side of each lead layer nearest to the magnetic field response portion and having a first interior angle with respect to the magnetoresistive film surface, and a second tapered portion, continuous with the first tapered portion, having a second interior angle with respect to the magnetoresistive film surface, the first interior angle being larger than the second interior angle, wherein the pair of lead layers are separated by a second distance smaller than the first distance;

a second magnetic gap film covering the magnetoresistive film and the pair of lead layers; and a second magnetic shield layer disposed on the second magnetic gap film.

2. The magnetoresistive transducer according to claim 1, wherein the magnetoresistance film comprises an anisotropic magnetoresistance film.

3. The magnetoresistive transducer according to claim 1, wherein the magnetoresistance film comprises a giant magnetoresistance film comprising ferromagnetic layers and an nonmagnetic conductive layer between the ferromagnetic layers.

4. The magnetoresistive transducer according to claim 3, wherein the giant magnetoresistance film comprises a spin valve giant magnetoresistance film.

5. The magnetoresistive transducer according to claim 1, wherein the first angle is between about 45° and about 90°.

6. The magnetoresistive transducer according to claim 1, wherein the second angle is between about 10° and about 60°.

7. The magnetoresistive transducer according to claim 1, wherein the sheet resistance of the first tapered portion is smaller than the sheet resistance of the magnetoresistive film.

8. The magnetoresistive transducer according to claim 1, wherein the second tapered portion comprises an isotropic etched surface and the first tapered portion comprises an anisotropic etched surface.

9. The magnetoresistive transducer according to claim 1, wherein the second tapered portion further includes a plurality of third tapered portions, wherein the third tapered portions are continuous with each other.

10. The magnetoresistive transducer according to claim 1, wherein the lead layers comprise plural films.

11. The magnetoresistive transducer according to claim 1, wherein an edge portion of the magnetoresistive film is between the biasing magnetic field generating film and one of the lead layers.

12. A reading/recording head comprising a reading head of a magnetoresistive transducer according to claim 1 and, a recording head of an inductive coil provided on the reading head.

13. A magnetoresistive transducer, comprising:

a magnetoresistive film having a magnetic field response portion, the magnetoresistive film having first and second surfaces;

a pair of leads on the first surface, a space between the pair of leads defining the magnetic field response portion, the leads having a first taper portion at the side of each lead nearest to the magnetic field response portion and having a first interior angle with respect to the first surface and a second taper portion having a second interior angle with respect to the first surface and continuous with the first taper portion, wherein the first interior angle is greater than the second interior angle; and a biasing magnetic field generating film on the second surface of the magnetoresistive film.

14. A magnetoresistive transducer, comprising:

a first magnetic shield layer;

a first magnetic gap film on the first magnetic shield layer;

a magnetoresistive film having a magnetic field response portion on the first magnetic gap firm;

a pair of magnetic bias layers on the magnetoresistive film so as to supply a magnetic bias field to the magnetoresistive film;

a pair of lead layers on the pair of magnetic bias layers so that a laminated layer one of each of the lead layers and magnetic bias layers serves as an electrical lead, each laminated layer having a first tapered portion on the side of each laminated layer nearest to the magnetic field response portion and having a first interior angle with respect to the magnetoresistive film surface, and a second tapered portion, continuous with the first tapered portion, having a second interior angle with respect to the magnetoresistive film surface, the first interior angle being larger than the second interior angle;

a second magnetic gap film covering the magnetoresistive film and the pair of lead layers; and a second magnetic shield layer on the second magnetic gap film.

15. The magnetoresistive transducer according to claim 14, wherein the pair of magnetic bias layers are formed on opposite sides of the magnetic field response portion.

16. The magnetoresistive transducer according to claim 14, wherein the pair of lead layers are separated by a first distance and wherein the magnetic bias layers are separated by a second distance smaller than the first distance.

17. The magnetoresistive transducer according to claim 14, wherein the first tapered portion of the laminated layer comprises the magnetic bias layer.

18. The magnetoresistive transducer according to claim 14, wherein the first tapered portion of the laminated layer comprises the lead layer.

19. A magnetoresistive transducer, comprising:

a magnetoresistive film having a magnetic field response portion, the magnetoresistive film having a first surface;

a pair of biasing magnetic field generating films on the first surface, a space between the pair of biasing magnetic field generating films defining the magnetic field response portion, the biasing magnetic field generating films having a first taper portion at the side of each film nearest to the magnetic field response portion and having a first interior angle with respect to the first surface and a second taper portion having a second interior angle with respect to the first surface and continuous with the first taper portion, wherein the first interior angle is greater than the second interior angle; and a pair of lead layers on the biasing magnetic field generating films.

* * * * *

UNITED STATES PATENT AND TRADEMARK OFFICE
CERTIFICATE OF CORRECTION

PATENT NO.: 5,946,167

DATED: August 31, 1999

INVENTOR(S): Hara et al.

It is certified that an error appears in the above-identified patent and that said Letters Patent is hereby corrected as shown below:

Claim 14, column 16, line 14, after "layer" insert --of--.

Signed and Sealed this

Seventh Day of March, 2000

Attest:

Attesting Officer

Q. TODD DICKINSON

Commissioner of Patents and Trademarks